US007496855B2

(12) United States Patent
Guido et al.

(10) Patent No.: US 7,496,855 B2
(45) Date of Patent: Feb. 24, 2009

(54) METHOD AND SYSTEM FOR MAINTAINING SCROLL POSITION IN A WEB USER INTERFACE

(75) Inventors: Patrick R. Guido, Cary, NC (US); Kent F. Hayes, Jr., Chapel Hill, NC (US); Robert C. Leah, Cary, NC (US); Paul F. McMahan, Apex, NC (US); Wayne B. Riley, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 10/711,781

(22) Filed: Oct. 5, 2004

(65) Prior Publication Data

US 2006/0075357 A1    Apr. 6, 2006

(51) Int. Cl.
*G06F 3/048* (2006.01)
(52) U.S. Cl. .................. 715/784; 715/785; 715/786
(58) Field of Classification Search .................. 715/784, 715/785, 786, 787, 742
See application file for complete search history.

(56) References Cited

U.S. PATENT DOCUMENTS

| 4,739,314 | A | | 4/1988 | McCaskill et al. |
| 5,506,951 | A | * | 4/1996 | Ishikawa ..................... 715/786 |
| 5,987,482 | A | | 11/1999 | Bates et al. |
| 6,014,140 | A | | 1/2000 | Strand |
| 6,157,381 | A | * | 12/2000 | Bates et al. .................. 715/786 |
| 6,205,947 | B1 | | 3/2001 | Drew |
| 6,219,679 | B1 | | 4/2001 | Brisebois et al. |
| 7,149,982 | B1 | * | 12/2006 | Duperrouzel et al. ....... 715/788 |
| 2003/0001866 | A1 | | 1/2003 | Bredow et al. |
| 2004/0021694 | A1 | | 2/2004 | Doar |
| 2006/0004763 | A1 | * | 1/2006 | Horvitz et al. .................. 707/9 |

OTHER PUBLICATIONS

Symonds, Robert. "More usable forms—controlling scroll position". Sep. 15, 2004. Available at: http://www.sitepoint.com/article/preserve-page-scroll-position.*

* cited by examiner

*Primary Examiner*—Stephen S Hong
*Assistant Examiner*—Omar Abdul-Ali
(74) *Attorney, Agent, or Firm*—Charles L. Moore; Frederick D. Bailey; Moore & Van Allen, PLLC

(57) ABSTRACT

A method for maintaining scroll position in a web user interface may include translating a selected scroll position in the web user interface to a pair of scroll coordinates in response to operation of a set scroll position function. The method may also include advancing the web user interface to the selected scroll position in response to each occurrence of an event. The event may include at least one of opening, reloading or refreshing the web user interface or operating a hyperlink in the web user interface.

32 Claims, 7 Drawing Sheets

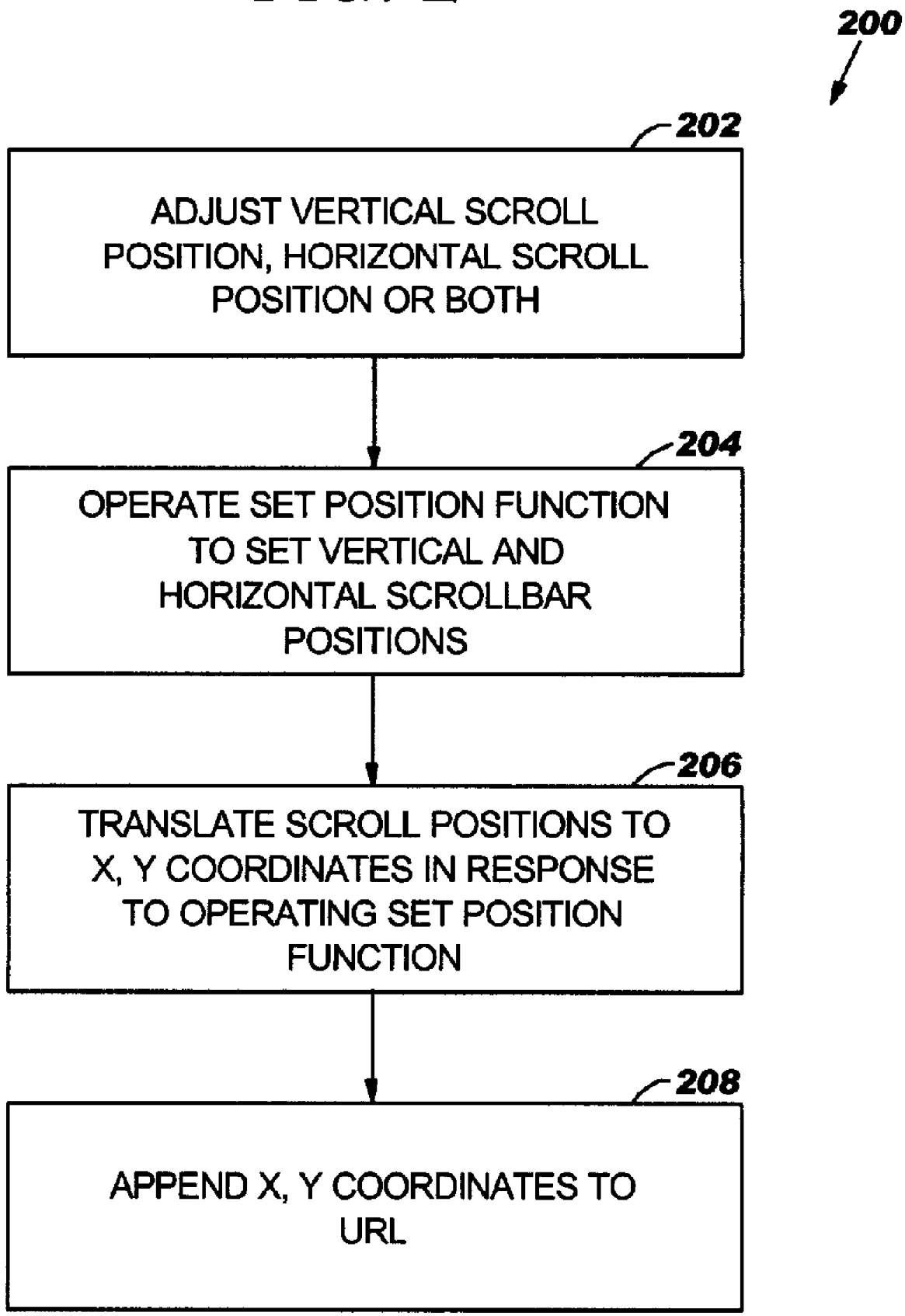

```
Market report                    Edit □ - ? ▽

Quoted at 4:04 PM, EDT on 6 Apr.
Refresh

Symbol     Current      +/-
IBM        93.70        -0.48

Indices          Last
DOWJONES         10,570.81
S&P 500          1,148.17
AMEX             1,265.39
FTSE             4,472.80
HANG SENG        12,886.97
NIKKEI           11,948.54
NASDAQ           2,059.90

View full market report
       Go to the scorecard home page
```

— 304

| On Demand | Maintain Position |
|---|---|
| On Demand<br>the new agenda<br>IT analysts evaluate o<br><br>Webcast: How we're tr<br>IBM | Top<br>Bottom<br><br>Page Up<br>Page Down<br><br>Scroll Up<br>Scroll Down |

— 302

306

Resources

— 308

METHOD AND SYSTEM FOR MAINTAINING SCROLL POSITION IN A WEB USER INTERFACE

BACKGROUND OF INVENTION

The present invention relates to web user interfaces and more particularly to a method and system for maintaining scroll position in a web user interface or the like.

Web based user interfaces commonly suffer from a usability issue related to scrolling. The issue is that a browser's scrollbar position is lost when a hypertext mark-up language (HTML) or similar language page is reloaded via an automated refresh, when a user or operator activates or clicks on a hyperlink or a similar operation that may cause a change in the page. This forces the user to manually scroll the resulting HTML page back to the location or scroll position of interest after the page has reloaded. FIGS. 1A and 1B are an example of an HTML page 100 that is reloaded. In FIG. 1A, the HTML page 100 has been by scrolled by a user or operator to a selected scroll position 102 in a web user interface 104 presentable by a browser (not shown). The HTML page 100 may be scroll to the selected scroll position 102 by moving a vertical slider 106 in a vertical scroll bar 108 and a horizontal slider 110 in a horizontal scroll bar 112. The HTML page 100 may be scrolled to the selected position 102 to display an artifact 114 or a selected portion of the page 100 of interest substantially completely within the web user interface 104. If the page 100 is reloaded or refreshed for any reason, the page 100 may not be scrolled or positioned in the selected scroll position 102 after the reload or refresh event and the artifact 114 or selected portion of the page 100 may not be completely viewable by the user as shown in FIG. 1B. Having to manually re-scroll the page 100 to substantially completely view the artifact 114 or page portion of interest after each refresh event or similar event can be aggravating and time consuming.

A current solution to the scrolling issue is for application developers to add named anchor points to their HTML. Using this technique, anchor elements, e.g., <A href="#name1">, may be added at predetermined locations in the HTML page. When the page is reloaded, the browser automatically positions the page at one of the named anchor points. One shortcoming of this named anchor point approach is that the anchor elements can only be positioned at certain predetermined points in the HTML document or page, and therefore cannot always scroll the user back to the exact spot where the user may have positioned or scrolled the HTML page before the reload occurred. This can result in the page appearing to "jump" between reloads, which can also be aggravating or tiresome to the user.

Another shortcoming of the named anchor approach is that the user may manually scroll the page to a position that differs from a location anticipated by the developer when creating the named anchor. For example, the developer may expect the user to always be focused on a certain location in the page, such as an event viewer or the like, and the developer will create a universal resource locator (URL) for the page reload which references the named anchor at that spot or location. However, a user may want to set the scroll position at some other location but does not have the flexibility under the named anchor approach.

SUMMARY OF INVENTION

In accordance with an embodiment of the present invention, a method for maintaining scroll position in a web user interface may include translating a selected scroll position in the web user interface to a pair of scroll coordinates in response to operation of a set scroll position function. The method may also include advancing the web user interface to the selected scroll position in response to each occurrence of an event, such as opening, reloading or refreshing the web user interface, operating a hyperlink in the web user interface or similar event or operation.

In accordance with another embodiment of the present invention, a method for maintaining scroll position in a web user interface may include receiving a browser request for a URL associated with the web user interface or web page. The method may also include generating a script for resetting a browser to a preset scroll position in response to the browser request containing a pair of scroll coordinates and adding the script to a response to the browser request. The method may further include automatically scrolling the browser to the preset scroll position in response to the script.

In accordance with another embodiment of the present invention, a system for maintaining scroll position in a web user interface may include a processor and a set scroll position function operable on the processor. The set scroll position function may include a data structure to translate a selected scroll position in the web user interface to a pair of scroll coordinates in response to operation of the set scroll position function. The set scroll position function may also include a data structure to advance the web user interface to the selected scroll position in response to each occurrence of an event that may include at least one of opening, reloading or refreshing the web user interface or operation of a hyperlink in the web user interface.

In accordance with another embodiment of the present invention, a system for maintaining scroll position in a web user interface may include a server and a data structure operable on the server to receive a browser request for a URL associated with the web user interface. The system may also include a data structure operable on the server to generate a script for resetting a browser to a preset scroll position in response to the browser request containing a pair of scroll coordinates. The system may also include a data structure operable on the server to add the script to a response to the browser request.

In accordance with another embodiment of the present invention, a method of making a system for maintaining scroll position in a web user interface may include providing a processor and providing a set scroll position function operable on the processor. Providing the set scroll position function may include providing a data structure to translate a selected scroll position in the web user interface to a pair of scroll coordinates in response to operation of the set scroll position function. Providing the set scroll position function may also include providing a data structure to advance the web user interface to the selected scroll position in response to each occurrence of an event that may include at least one of opening, reloading or refreshing the web user interface or operation of a hyperlink in the web user interface.

In accordance with another embodiment of the present invention, a web user interface may include a scroll feature to scroll the web user interface to a selected position in at least a horizontal or a vertical direction. The web user interface may also include a set scroll position feature displayable in the web user interface to set or lock the selected scroll position.

In accordance with another embodiment of the present invention, a computer-readable medium having computer-executable instructions for performing a method that may include translating a selected scroll position in the web user interface to a pair of scroll coordinates in response to operation of a set scroll position function. The method may also include advancing the web user interface to the selected scroll position in response to each occurrence of an event including at least one of opening, reloading or refreshing the web user interface or operating a hyperlink in the web user interface.

DESCRIPTION OF DRAWINGS

FIG. 2 is a flow chart of an exemplary method for maintaining position in a web user interface in accordance with an embodiment of the present invention.

FIG. 3 is an example of a web user interface including a set scroll position feature in accordance with an embodiment of the present invention.

DETAILED DESCRIPTION

The following detailed description of preferred embodiments refers to the accompanying drawings, which illustrate specific embodiments of the invention. Other embodiments having different structures and operations do not depart from the scope of the present invention.

Figure 1B:
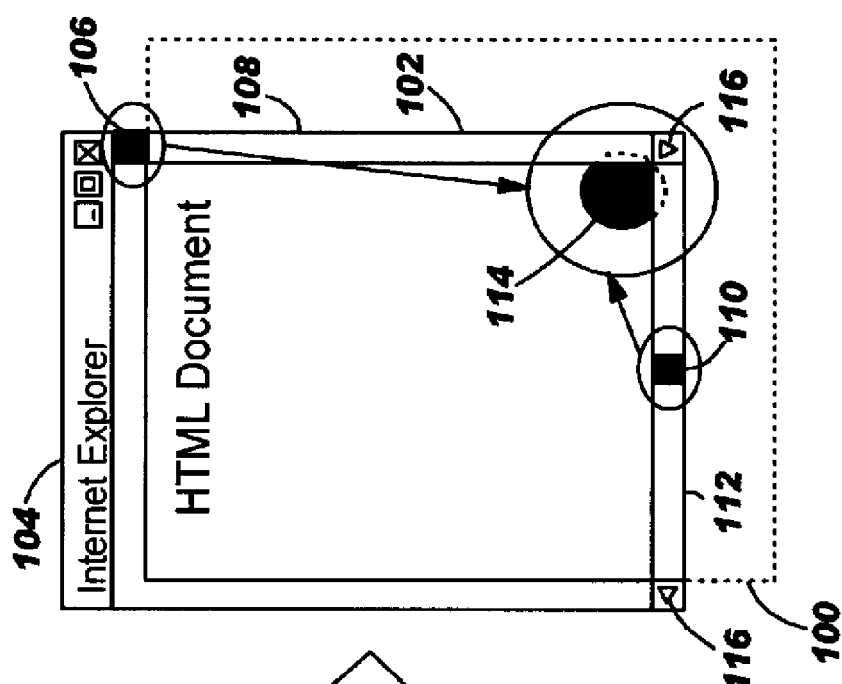
FIGS. 1A and 1B illustrate an example of a prior art web user interface or web page that is refreshed or reloaded after scrolling the interface to a selected scroll position.
Figure 1A:
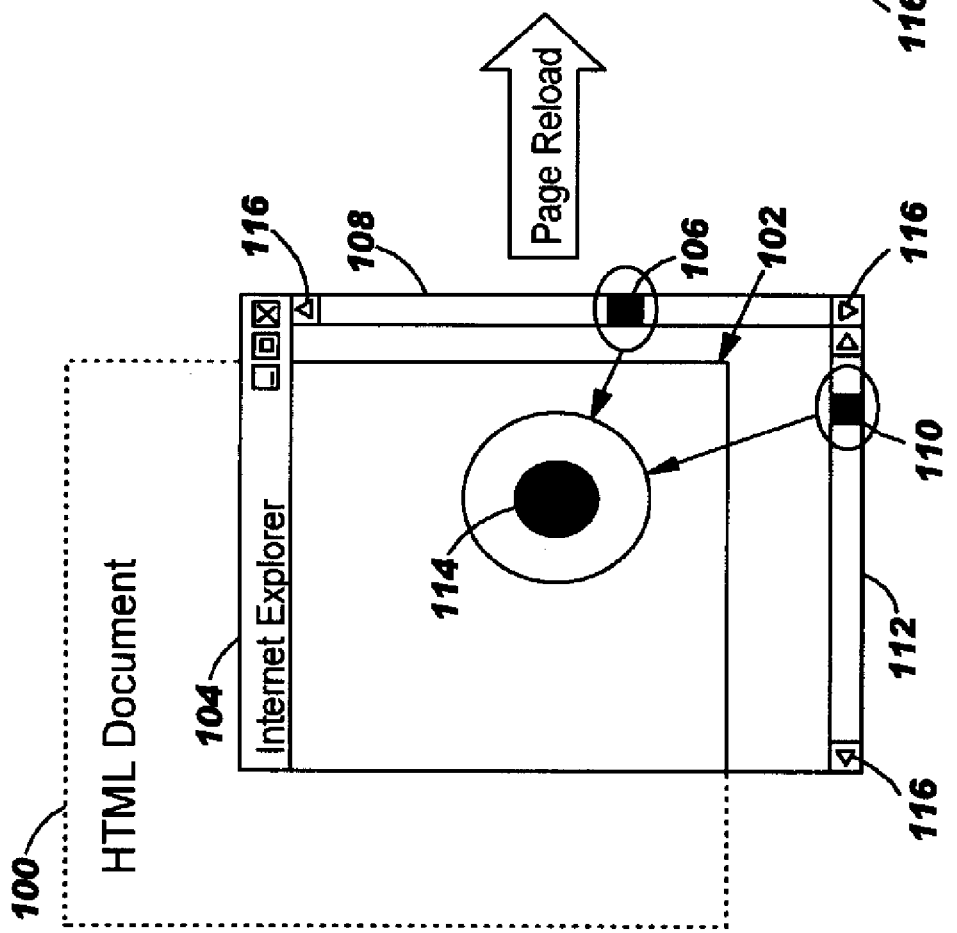

FIG. 2 is a flow chart of an exemplary method 200 for maintaining position in a web user interface in accordance with an embodiment of the present invention. The web user interface may be an HTML page, portlet, portal or the like. In block 202, a vertical scroll position, a horizontal scroll position or both scroll positions of the web user interface may be adjusted. Each of the scroll positions may be adjusted using a slider in a scrollbar similar to that described with respect to FIGS. 1A and 1B. The slider may be clicked on and dragged using a computer pointing device, such as a mouse or the like, to move the web interface to a selected or preset position by a user. Alternatively, an arrowhead 116 (FIGS. 1A and 1B) at each end of the scrollbars 108 and 112 may be activated or clicked on by the computer pointing device to position the web user interface at the desired, selected or preset position.

In block 204, a set scroll position function may be operated to set at least one of the vertical and horizontal scrollbar positions. The set scroll position function may be operated by activating or operating a set scroll position feature that may be presented in the web user interface. Referring also to FIG. 3, FIG. 3 illustrates an example of a web user interface 300 including a set scroll position feature 302 in accordance with an embodiment of the present invention. In the web user interface 300, the set scroll position feature 302 may include a "Maintain Position" option 304 presentable in a context menu 306. The context menu 306 may be presented or displayed in response to performing a right click action or similar operation on a scrollbar 308 of the web interface 300 using a computer pointing device or the like. Once the web interface 300 has been scrolled using a browser to a desired or selected scroll position using the scrollbar 308, the context menu 306 may be presented by right clicking the scrollbar 308 using the pointing device. The "Maintain Position" option 304 may then be selected from the context menu 306 to maintain or lock the exact or precise scroll position of the web user interface 300. The web user interface 300 or page may then return or re-scroll to the precise or exact, selected scroll position in response to each event, such as opening, reloading or refreshing the web user interface 300 or operating a hyperlink in the web user interface 300 or any other event that may affect the scroll position without the set scroll position function or feature 302 of the present invention being activated.

Figure 4:
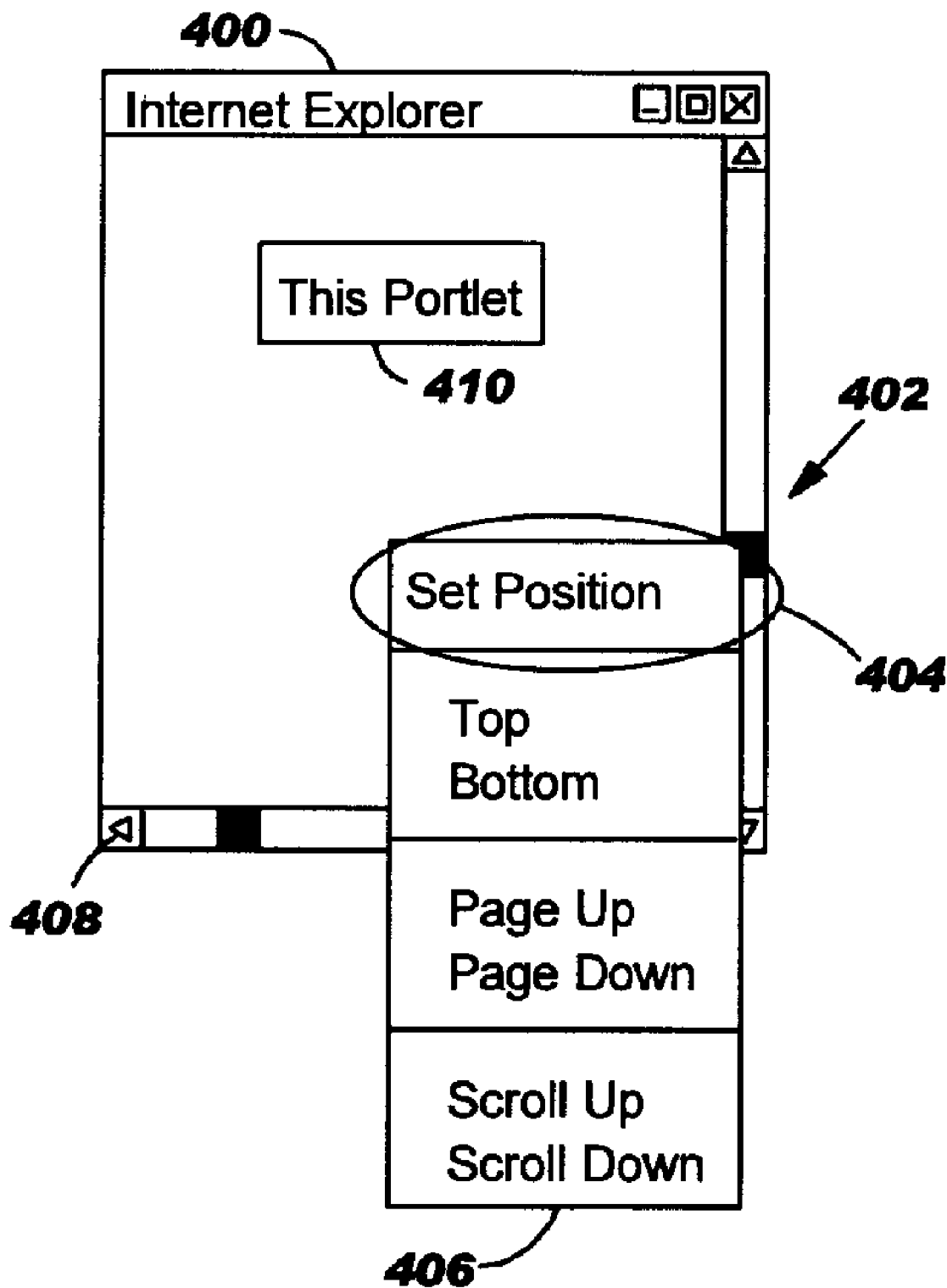
FIG. 4 is an example of a web user interface including a set scroll position feature or function in accordance with another embodiment of the present invention.

In another embodiment of the present invention illustrated in FIG. 4, a web user interface 400 may have a set scroll position feature 402 that includes a "Set Position" option 404 or the like in a context menu 406 that may operate similar to the "Maintain Position" option 302 in FIG. 3. In this embodiment of the present invention, a vertical scroll position may be selected using a vertical scrollbar 406 and a horizontal scroll position may be selected using a horizontal scroll bar 408. The vertical scroll position or horizontal scroll position or both may be set in response to operation of the set scroll position feature 402.

In another embodiment of the present invention, either one of the vertical or horizontal scroll positions may be set similar to that described above. The other of the vertical or horizontal scroll positions may then be automatically set in response to setting the one scroll position. In this manner, the vertical and horizontal scroll positions do not have to each be individually set but one operation sets both scroll positions.

Figure 5A:
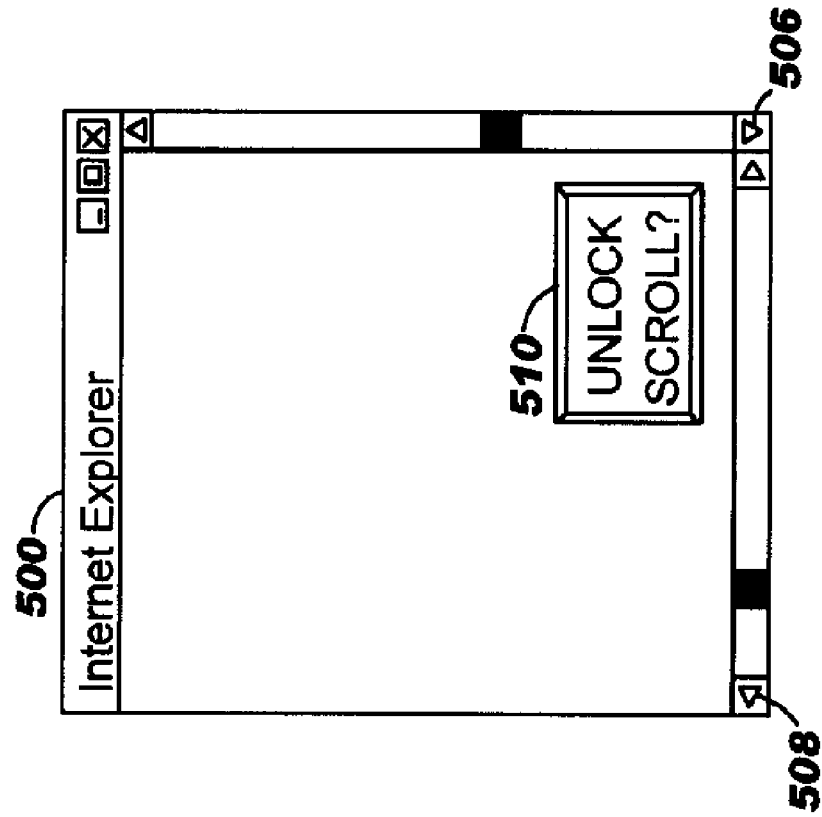
FIGS. 5A and 5B are each an example of a web user interface including a set scroll position feature in accordance with a further embodiment of the present invention.
Figure 5B:
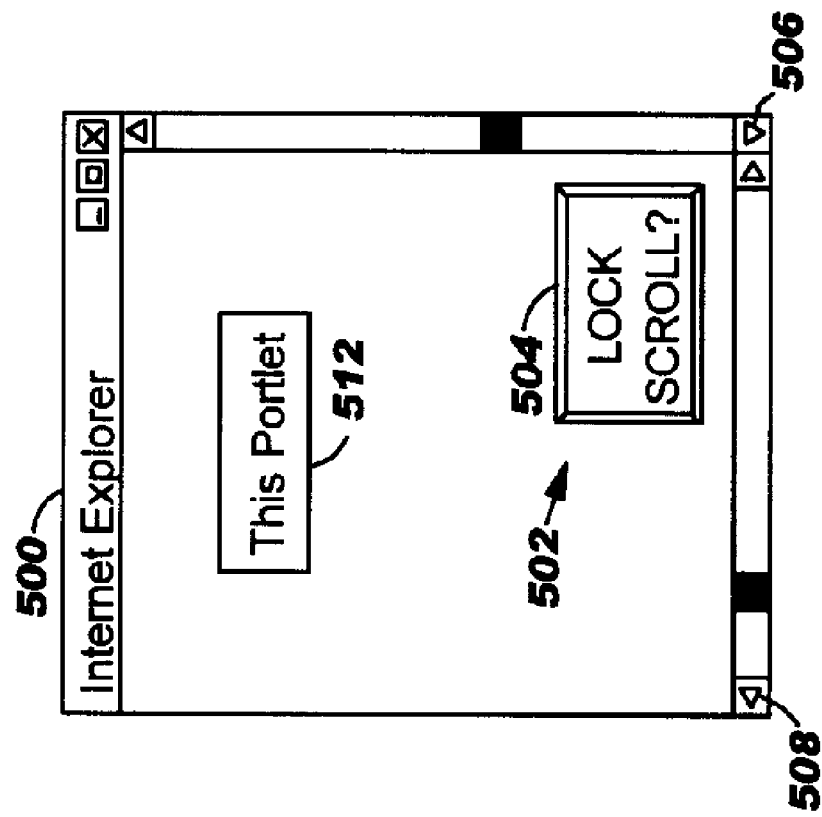

FIGS. 5A and 5B are an example of a web user interface 500 including a set scroll position feature 502 in accordance with a further embodiment of the present invention. In web user interface 500, a selected scroll position may be set or locked in response to operating a button 504 or the like. The button 504 may be a floating button. The button 504 may be labeled "LOCK SCROLL?" or other appropriate label that illustrates the function of the button 504. Operating or clicking on the button 504 may have a similar effect as selecting "Maintain Position" option 304 in FIG. 3 or the "Set Position" option 404 in FIG. 4. Accordingly, a vertical scroll bar 506 and a horizontal scrollbar 508 may be adjusted to position the web user interface 500 at a selected or desired scroll position using a computer pointing device or the like. The "Lock Scroll?" button 504 may then be operated using the pointing device to set or lock the selected scroll positions. After operating the button 504 to set or lock the scroll positions, the button 504 may change to a button 510 that may be labeled "Unlock Scroll?" or other appropriate label to illustrate the function of the button 510. The scroll positions may be unlocked in response to operating the "Unlock Scroll?" button 510 to permit the scroll positions to be readjusted by the user. Similarly, the options 304 and 404 may change to permit the user to unset or free the scroll positions for readjustment.

The web user interfaces 400 and 500 in FIGS. 4, 5A and 5B, respectively, may be a portal environment including a plurality of portlets. A portlet may have a "THIS PORTLET" option or button 410 or 512. The "THIS PORTLET" option 410 or 512 may be operated or selected in a particular portlet to implement the present invention with respect to that portlet. The particular portlet may then be automatically scrolled into view each the portal or portlet environment associated with the portlet is accessed or entered. The set scroll position feature may be useful in the portlet environment because in a work page concept a user often opens new portlets and/or closes existing portlets. As a side benefit, the set scroll feature of the present invention does not require the user to make any selections or gestures inside any particular form or portlet to set the scroll position.

Referring back to FIG. 2, in block 206, the selected scroll positions may be translated into a pair of X and Y coordinates in response to operating the set position function. A script, such as a JavaScript or the like, may be added to a web user interface or page to obtain a current scroll position when set by a user or in response to operation of the set position function. The script may translate the desired or selected scroll position into the X and Y coordinates. An example of a JavaScript for translating the selected scroll position into the X and Y coordinates may be as followings:

```
<script>
var x=document.body.scrollLeft;
var y=document.body.scrollTop;
</script>
```

In block 208, the X and Y coordinates may be appended to a URL corresponding to the web user interface or page in response to the URL being requested by an application server or the like. The pair of X and Y coordinates may be stored in association with the URL for the associated web user interface or web page.

The script or JavaScript may be used to listen for an unload event or onUnload event that may be triggered in response to a browser unloading the web user interface or page. The script may translate the selected scroll position to the X and Y scroll coordinates in response to detecting or hearing the unload event. An example of a script or code to listen for the unload event and to append the x and Y coordinates to the URL is as follows:

```
<script>
document.onunload=appendXY( );
function appendXY( ){
//append the X and Y
//coordinates to the URL
}
</script>
```

Figure 6:
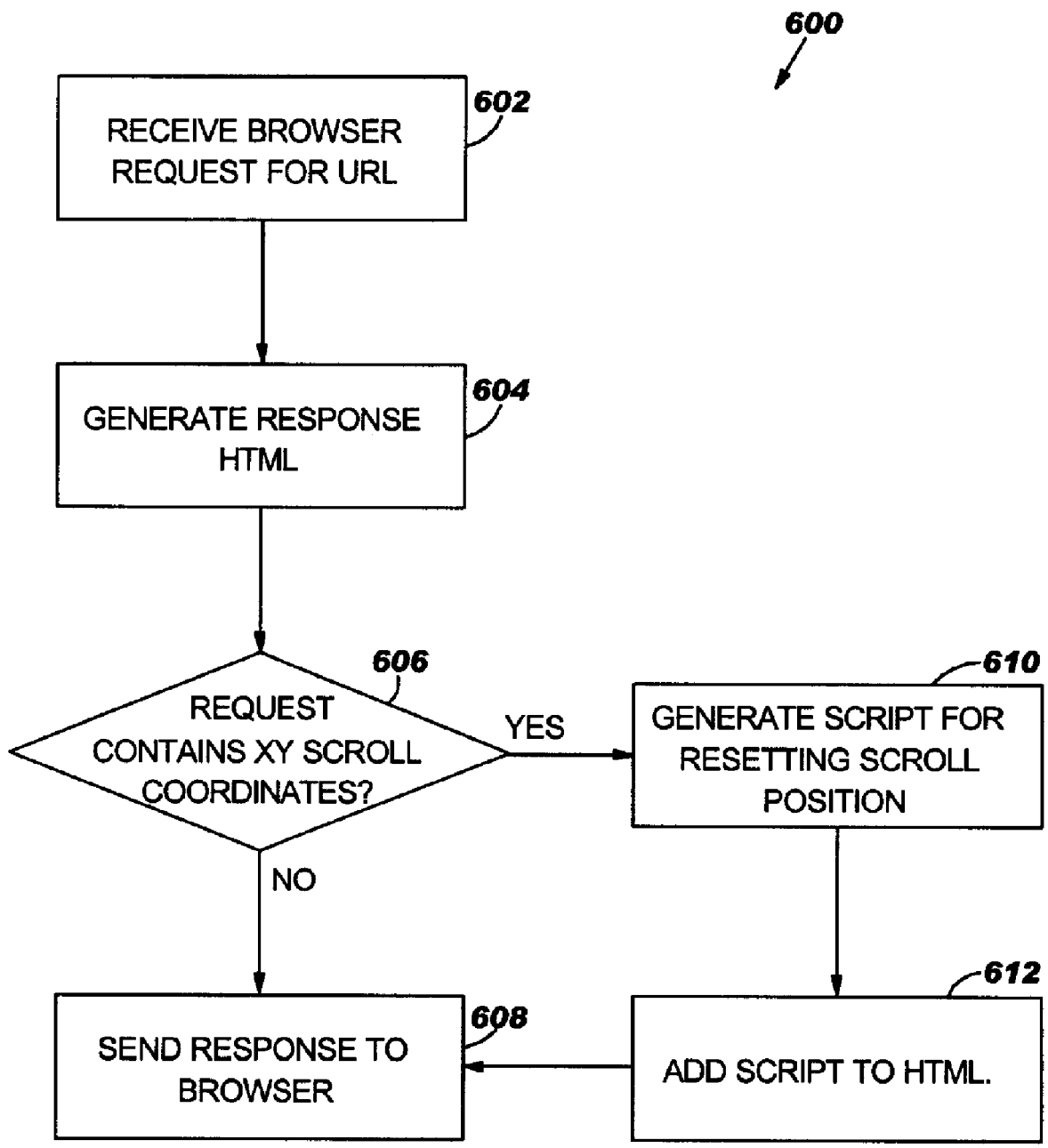
FIG. 6 is a flow chart of an exemplary method for maintaining position in a web user interface in accordance with another embodiment of the present invention.

FIG. 6 is a flow chart of an exemplary method 600 for maintaining position in a web user interface in accordance with another embodiment of the present invention. In block 602, a browser request may be received for a URL associated with a web user interface or page. The browser request may be received by a server, such as an application server or the like. In block 604, a response to the browser request in HTML or the like may be generated. In block 606, a determination may be made whether the browser request contains a pair of scroll coordinates. If the browser request does not contain a pair of scroll coordinates, the method 600 may advance to block 608. In block 608, the response may be sent to the browser. If the browser request does contain a pair of coordinates in decision block 606, the method 600 may advance to block 610. In block 610, a script for resetting the browser or web user interface to a preset or selected scroll position may be generated. In block 612, the script for resetting the scroll position may be added to the response. In block 608, the response including the appended script may be sent to the browser. The browser or web user interface may automatically be scrolled exactly or precisely to the preset or selected scroll position in response to the script.

Figure 7:
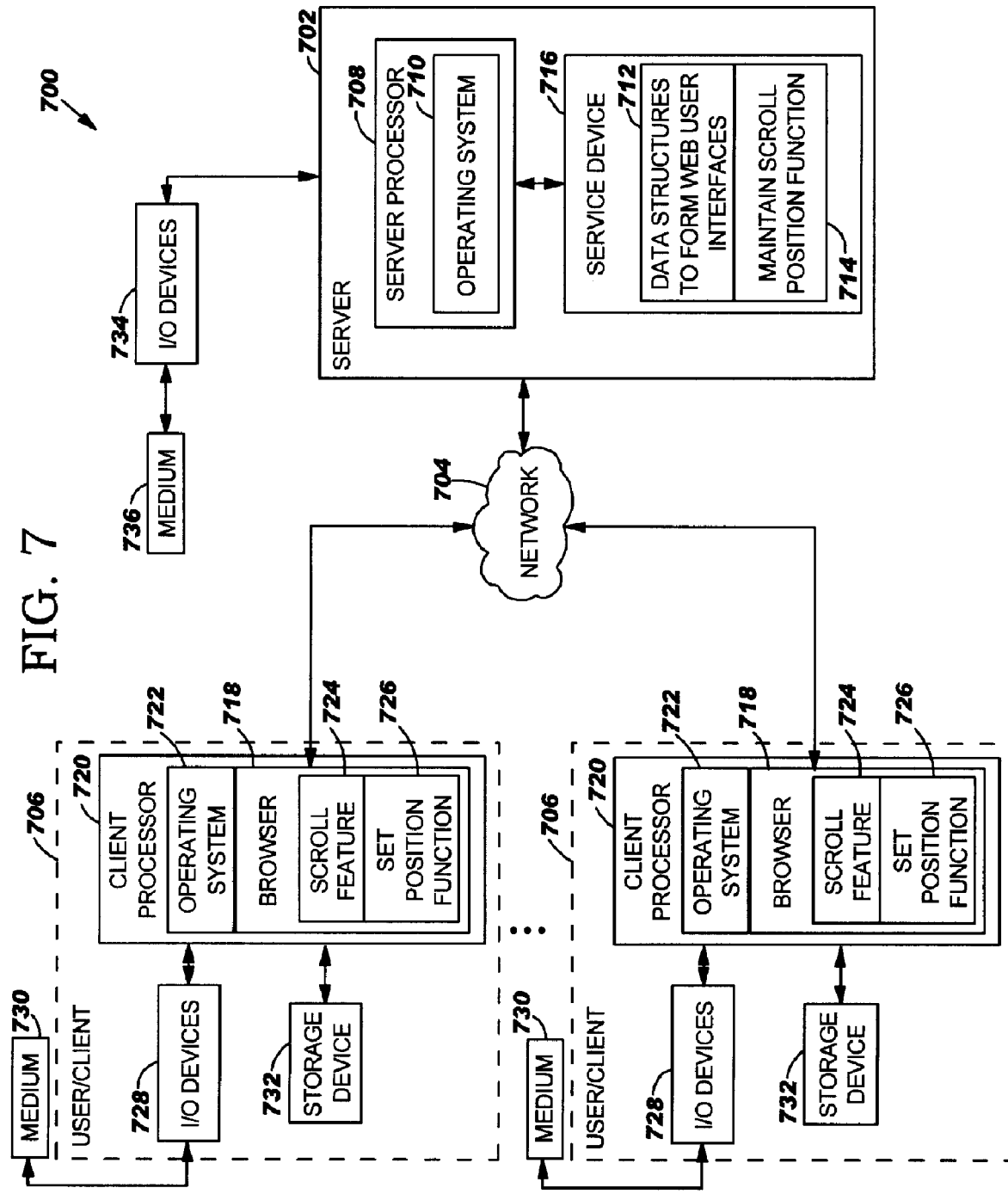
FIG. 7 is an example of a system for maintaining scroll position in a web user interface in accordance with an embodiment of the present invention.

FIG. 7 is an example of a system 700 for maintaining scroll position in a web user interface in accordance with an embodiment of the present invention. Elements of the methods 200 and 600 of FIGS. 2 and 6 respectively may be embodied in the system 700. Additionally, data structures or code to form web user interfaces or pages 300, 400 and 500 of FIGS. 3, 4, 5A and 5B, respectively, may also be embodied in system 700. The system 700 may include a server 702. The server 702 may be an application server, portal server or other server accessible via a network 704 or medium by one or more users or clients 706. The server 702 may provide common services, such as application connectivity, integration, administration, and presentation capabilities that may be needed across the system 700 or a portal environment.

The network 704 may be any network or medium including by way of example, dedicated communication lines, telephone networks, and wireless data transmission systems, two-way cable systems, and customized computer networks, interactive kiosk networks, a private network or intranet, the Internet or the like.

The server 702 may include a server processor 708 and an operating system 710 operable on the server processor 708 to manage basic operations of the server 702 and to utilize other applications to perform different functions or specific operations associated with the server 702. The server 702 may also include data structures 712 or code to form web user interfaces, such as web user interfaces 300, 400 and 500 of FIGS. 3, 4, 5A and 5B. The server 702 may also include a maintain scroll position function 714. The data structures 712 and 714 may reside in a storage device 716 to be accessed or called when needed by the server processor 708 or operating system 710. Alternatively, the data structures 712 and 714 may reside on the server processor 708.

Data structures to perform operations or functions similar to those described with respect to method 600 of FIG. 6 may operate on the server 702 and may be embodied in the maintain scroll position function 714. A data structure may be operable on the server 702 to receive a browser request from the user or client 706. Another data structure operable on the server 702 may generate a script for resetting a browser 718 of the user or client 706 to a preset scroll position in response to the browser request including a pair of scroll coordinates. A further data structure that may be operable on the server 702 may add the script to a response to the browser request. The browser 716 may then automatically scroll to the preset scroll position in response to the script appended to the response.

Each user or client 706 may include a client processor 720. An operating system 722 may operate on the client processor 720 to control overall operation of the user or client 706. The user or client 706 may be a desktop or mobile computer system, cellular phone, personal digital assistant or the like. The browser 718 or Internet browser may operate on the client processor 720 to facilitate accessing the server 702 and transmitting browser requests to the server 702, as previously discussed. A scroll function 724 may be operable on the browser 718. The scroll function 724 may facilitate a user manually adjusting a vertical scroll position, horizontal scroll position or both of a web user interface or web page. The scroll positions may be adjusted using scrollbars or like means, similar to that described with respect to web user interfaces 300, 400 and 500 of FIGS. 3, 4, 5A and 5B and method 200 of FIG. 2.

A set scroll position function 726 may also be operable on the client processor 720 or browser 718. The set scroll position function 726 may be operated to set either a vertical scroll position, horizontal scroll position or both. The set scroll position function 726 may operate similar to that described with respect to method 200 in response to activating or operating a set scroll position feature or icon associated with a web user interface, such as interfaces 300, 400 and 500 of FIGS. 3, 4, 5A and 5B, respectively. The set scroll position function 726 may include a data structure to translate a selected or preset scroll position in a web user interface to a pair of scroll coordinates in response to operation of the set scroll position feature, icon or button. The set scroll position function 726 may also include a data structure to advance the web user interface to the selected or preset scroll position in response to each occurrence of an event that may include at least one of opening, reloading, or refreshing the web user interface or page, operation of a hyperlink in the web user interface or other event or action that may affect the scroll position of the web user interface if not set or locked to the selected or preset position.

The set scroll position function 726 may include a script, such as a JavaScript or the like, that may listen for an onUnload ( ) event or unload event which may be triggered whenever the browser 718 is unloading a current page. The script may translate a user's desired or selected scroll position into a pair of X and Y coordinates. The pair of coordinates may be appended to a URL associated with a web user interface or page whenever the web user interface or page may be requested from the server 702. Similar to that previously described, when the server 702 receives the browser request and finds the X and Y coordinates appended to the request URL, the server 702 or maintain scroll position function 714 operating on the server 702 may generate a JavaScript or the like and add or append the JavaScript to the response. The JavaScript added to the response causes the browser to automatically scroll to the exact same scroll position selected or preset by the user 706, similar to that described with respect to method 600 of FIG. 6.

Each user or client 706 may include a plurality of input/output (I/O) devices 728. The I/O devices 728 may be input and output devices or combination input and output devices. The I/O devices 728 permit a user to control operation and interface with the client processor 720. The I/O devices 728 also permit a user to control operation of the scroll function 724 and set scroll position function 726, as well as other programs or applications that may be operable on the client processor 720 or accessible by the client processor 720. The I/O devices 728 may include a display or monitor to display web user interfaces or web pages. The I/O devices 728 may also include a keyboard and computer pointing device or the like to control operation of the scroll function 724 and set scroll position function 726 and other programs or applications. The I/O devices 728 may further include disk drives, optical, mechanical, magnetic, or infrared input/output devices, modems or the like. The I/O devices 728 may be used to access a medium 730. The medium 730 may contain, store, communicate or transport computer-readable or computer-executable instructions or other information for use by or in conjunction with a system, such as the system 700 or user/client system 706.

Each user or client 706 may also include a storage device 732 to store application programs and data that may be used by the application programs, such as the set scroll position function or program 726 or other programs.

Multiple input/output (I/O) devices 734 may be associated with the server 702. The I/O devices 734 may be similar to I/O devices 728. The I/O devices 734 permit a user or administrator to operate and interface with the server 702 and to control operation of applications operating on the server 702, such as the data structures to form the web user interfaces 712, the maintain scroll position function 714 and other applications. The I/O devices 734 may also be used to access a medium 736. The medium 736 may contain, store, communicate or transport computer-readable or computer executable instructions or other information for use by or in connection with a system, such as the server 702 or system 700.

Elements of the present invention, such as methods 200 and 600 of FIGS. 2 and 6 respectively, web user interfaces 300, 400 and 500 of FIGS. 3, 4, 5A and 5B, respectively, and system 700 of FIG. 7, may be embodied in hardware and/or software as a computer program code that may include firmware, resident software, microcode or the like. Additionally, elements of the invention may take the form of a computer program product on a computer-usable or computer-readable storage medium having computer-usable or computer-readable program code embodied in a medium for use by or in connection with a system, such as system 700 of FIG. 7. Examples of such a medium may be illustrated in FIG. 7 as I/O devices 728 and 734 or medium 730 and 736. A computer-usable or readable medium may be any medium that may contain, store, communicate or transport the program for use by or in connection with a system. The medium, for example, may be an electronic, magnetic, optical, electromagnetic, infrared or semiconductor system or the like. The medium may also be simply a stream of information being retrieved when the computer program product is "downloaded" through a network, such as the Internet or the like. The computer-usable or readable medium could also be paper or another suitable medium upon which the program may be printed.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for maintaining scroll position in a web user interface, comprising:

using a JavaScript to listen for an event triggered in response to a browser unloading the web user interface;

operating the set scroll position function in response to a right click action in a scrollbar of the web user interface to present a menu including a set position option;

appending a pair of scroll coordinates to a URL associated with the web user interface in response to operation of a set scroll position function in the browser;

receiving a browser request for a URL associated with the web user interface;

generating a script for resetting the web user interface to the selected scroll position in response to the browser request containing the pair of scroll coordinates;

adding the script to a response to the browser request;

automatically scrolling a browser to the selected scroll position in response to the script; and advancing the web user interface to the selected scroll position in response to each occurrence of the event including at least one of opening, reloading or refreshing the web user interface or opening a hyperlink in the web user interface, wherein in response to the operation of the set scroll position function setting a vertical scroll position a horizontal scroll position is automatically set and in response to the set scroll position function setting a horizontal scroll position the vertical scroll position is automatically set.

2. The method of claim 1, further comprising setting at least a vertical scroll position and a horizontal scroll position in response to operation of the set scroll position function.

3. The method of claim 1, further comprising storing the pair of scroll coordinates in association with a universal resource locator (URL) for the web user interface.

4. The method of claim 1, further comprising operating the set scroll position function in response to operating a button in the web user interface.

5. The method of claim 1, further comprising using a JavaScript to translate the selected scroll position to the pair of scroll coordinates.

6. The method of claim 1, further comprising operating the set scroll position function in association with a selected portlet in a portal environment to present the selected portlet at a same selected scroll position each time the portal environment is entered, refreshed, reloaded or another portlet or hyperlink is activated in the portal environment.

7. A method for maintaining scroll position in a web user interface, comprising:
   using a JavaScript to listen for an event triggered in response to a browser unloading the web user interface;
   appending a pair of scroll coordinates to a URL associated with the web user interface in response to operation of a set scroll position function in the browser;
   receiving a browser request for the URL associated with the web user interface;
   generating a script for resetting the browser to a preset scroll position in response to the browser request containing a pair of scroll coordinates;
   adding the script to a response to the browser request; and
   automatically scrolling the browser to the preset scroll position in response to the script,
   wherein in response to the operation of the set scroll position function setting a vertical scroll position a horizontal scroll position is automatically set and in response to the set scroll position function setting a horizontal scroll position the vertical scroll position is automatically set.

8. The method of claim 7, further comprising forming the pair of scroll coordinates by translating the preset scroll position in the web user interface.

9. The method of claim 7, further comprising:
   listening for the triggered event; and
   appending the pair of scroll coordinates to the URL in response to detecting the triggered event.

10. The method of claim 7, further comprising translating the preset scroll position to the pair of scroll coordinates in response to operation of a set scroll position function in the browser.

11. A system for maintaining scroll position in a web user interface, comprising:
   a processor;
   a set scroll position function operable on the processor, wherein the set scroll position function includes:
   a data structure to translate a selected scroll position in the web user interface to a pair of scroll coordinates in response to operation of the set scroll position function; and
   a data structure to advance the web user interface to the selected scroll position in response to each occurrence of an event including at least one of opening, reloading or refreshing the web user interface or operation of a hyperlink in the web user interface
   wherein the set scroll position function comprises a JavaScript to listen for an unload even and to translate the scroll position to the pair of scroll coordinates,
   wherein the pair of scroll coordinates are appended to a URL associated with the web user interface in response to operation of the set scroll position function,
   wherein in response to the operation of the set scroll position function setting a vertical scroll position a horizontal scroll position is automatically set and in response to the set scroll position function setting a horizontal scroll position the vertical scroll position is automatically set.

12. The system of claim 11, further comprising a data structure to set at least the vertical scroll position and the horizontal scroll position in response to operation of the set scroll position function.

13. The system of claim 11, further comprising a storage device to store the pair of scroll coordinates in association with a URL for the web user interface.

14. The system of claim 11, wherein the set scroll position function is operated in response to one of a right clicking action in a scrollbar of the web user interface to present a menu including a set position option or operation of a button in the web user interface.

15. A system for maintaining scroll position in a web user interface, comprising:
   a server;
   a data structure using a JavaScript to listen for an unload event;
   a data structure to append the pair of scroll coordinates to a URL in response to operation of a set scroll position function in a browser;
   a data structure operable on the server to receive a browser request for the URL associated with the web user interface;
   a data structure operable on the server to generate a script for resetting a browser to a preset scroll position in response to the browser request containing a pair of scroll coordinates; and
   a data structure operable on the server to add the script to a response to the browser request,
   wherein in response to the operation of the set scroll position function setting a vertical scroll position a horizontal scroll position is automatically set and in response to the set scroll position function setting a horizontal scroll position the vertical scroll position is automatically set.

16. The system of claim 15, further comprising a data structure to automatically scroll the browser to the preset scroll position in response to the script.

17. The system of claim 15, further comprising:
   a data structure to append the pair of scroll coordinates to the URL in response to detecting the unload event.

18. The system of claim 15, further comprising a data structure to translate the preset scroll position to the pair of scroll coordinates in response to operation of the set scroll position function.

19. A method of making a system for maintaining scroll position in a web user interface, comprising:
   providing a processor;
   providing a data structure using a JavaScript to listen for an unload event;
   providing a data structure to append the pair of scroll coordinates to a URL corresponding to the web user interface in response to detecting the unload event;
   providing a set scroll position function operable on the processor, wherein providing the set scroll position function includes:
   providing a data structure to translate a selected scroll position in the web user interface to a pair of scroll coordinates in response to operation of the set scroll position function;
   providing a data structure to advance the web user interface to the selected scroll position in response to each occurrence of an event including at least one of opening, reloading or refreshing the web user interface or operation of a hyperlink in the web user interface;
   providing a server;

providing a data structure operable on the server to receive a browser request for a URL associated with the web user interface;

providing a data structure operable on the server to generate a script for resetting a browser to the selected scroll position in response to the browser request containing a pair of scroll coordinates; and providing a data structure operable on the server to add the script to a response to the browser request, wherein in response to the operation of the set scroll position function setting a vertical scroll position a horizontal scroll position is automatically set and in response to the set scroll position function setting a horizontal scroll position the vertical scroll position is automatically set.

20. The method of claim 19, further comprising providing a data structure to automatically scroll the browser to the selected scroll position in response to the script.

21. The method of claim 19, further comprising providing a data structure to append the pair of scroll coordinates to a URL corresponding to the web user interface in response to operation of a set scroll position function in a browser.

22. A device comprising:
at least one input/output device;
a storage device; and
a processor, the processor providing a web user interface, the web user interface comprising:
a scroll feature to scroll the web user interface to a selected position in at least a horizontal or a vertical direction;
a set scroll position feature displayable in the web user interface to set or lock the selected scroll position;
appending a pair of scroll coordinates to a URL associated with the web user interface in response to operation of the set scroll position feature; and
a preset scroll position feature, the preset scroll position feature:
receiving a browser request for a URL associated with the web user interface;
generating a script for resetting a browser to a preset scroll position in response to the browser request containing a pair of scroll coordinates;
adding the script to a response to the browser request; and
automatically scrolling the browser to the preset scroll position in response to the script,
wherein in response to the operation of the set scroll position feature setting a vertical scroll position a horizontal scroll position is automatically set and in response to the set scroll position feature setting a horizontal scroll position the vertical scroll position is automatically set.

23. The device of claim 22, wherein the set scroll position feature comprises a set scroll position option included in a context menu.

24. The device of claim 23, wherein the context menu is displayed in response to performing a right-clicking action on a scrollbar of a browser.

25. The device of claim 22, wherein the set scroll position feature comprises a floating button.

26. The device of claim 22, wherein operation of the set scroll feature causes the selected scroll position in the web user interface to be translated to a pair of scroll coordinates.

27. The device of claim 22, wherein operation of the set scroll position feature causes a browser to advance the web user interface to the selected scroll position in response to an occurrence of each event including at least one of opening, reloading or refreshing the web user interface or operating a hyperlink in the web user interface.

28. A computer-readable medium comprising one from the group consisting of an electronic medium, a magnetic medium, an electromagnetic medium and a semiconductor medium, having computer executable instructions stored therein, the instructions when executed causing a processing device to perform:
translating a selected scroll position in the web user interface to a pair of scroll coordinates in response to operation of a set scroll position function;
appending a pair of scroll coordinates to a URL associated with the web user interface in response to operation of the set scroll position feature;
advancing the web user interface to the selected scroll position in response to each occurrence of an event including at least one of opening, reloading, or refreshing the web user interface of operation a hyperlink in the web user interface;
receiving a browser request for a URL associated with the web user interface;
generating a script for resetting the web user interface to the selected scroll position in response to the browser request containing the pair of scroll coordinates;
adding the script to a response to the browser request; and
automatically scrolling a browser to the selected scroll position in response to the script,
wherein in response to the operation of the set scroll position feature setting a vertical scroll position a horizontal scroll position is automatically set and in response to the set scroll position feature setting a horizontal scroll position the vertical scroll position is automatically set.

29. The computer-readable medium having computer executable instructions for performing the method of claim 28, further comprising:
setting either a vertical or horizontal scroll position in response to operation of the set scroll position function; and
automatically setting the other of the vertical or horizontal scroll position in response to setting either the vertical or horizontal scroll position.

30. The computer-readable medium having computer executable instructions for performing the method of claim 28, further comprising storing the pair of scroll coordinates in association with a universal resource locator (URL) for the web user interface.

31. The computer-readable medium having computer executable instructions for performing the method of claim 28, further comprising operating the set scroll position function in response to one of a right click action in a scrollbar of the web user interface to present a menu including a set position option or operating a button in the web user interface.

32. The computer-readable medium having computer executable instructions for performing the method of claim 28, further comprising listening for an unload event triggered in response to a browser unloading the web user interface.

* * * * *